United States Patent
Reiher et al.

(10) Patent No.: US 12,034,357 B2
(45) Date of Patent: Jul. 9, 2024

(54) ELECTRIC MOTOR

(71) Applicant: Brose Fahrzeugteile SE & Co. Kommanditgesellschaft, Würzburg, Würzburg (DE)

(72) Inventors: Steffen Reiher, Strahlungen (DE); Steffen Manger, Volkach (DE); Christof Goeke, Würzburg (DE); Benjamin Nelson, Dettelbach (DE)

(73) Assignee: Brose Fahrzeugteile SE & Co. Kommanditgesellschaft, Würzburg (DE)

( * ) Notice: Subject to any disclaimer, the term of this patent is extended or adjusted under 35 U.S.C. 154(b) by 512 days.

(21) Appl. No.: 17/346,978

(22) PCT Filed: Dec. 12, 2019

(86) PCT No.: PCT/EP2019/084856
§ 371 (c)(1),
(2) Date: Aug. 12, 2021

(87) PCT Pub. No.: WO2020/120661
PCT Pub. Date: Jun. 18, 2020

(65) Prior Publication Data
US 2022/0271618 A1    Aug. 25, 2022

(30) Foreign Application Priority Data
Dec. 14, 2018 (DE) ............. 10 2018 221 829.3

(51) Int. Cl.
*H02K 5/26* (2006.01)
*H02K 7/00* (2006.01)

(52) U.S. Cl.
CPC ............. *H02K 7/006* (2013.01); *H02K 5/26* (2013.01); *H02K 7/003* (2013.01)

(58) Field of Classification Search
CPC ........ H02K 5/26; H02K 5/161; H02K 5/1732; H02K 7/14; H02K 7/1008; H02K 7/1004;
(Continued)

(56) References Cited

U.S. PATENT DOCUMENTS 7,516,535 B1 * 4/2009 Emery ................ F16J 15/3488
277/369
2012/0255387 A1 * 10/2012 Baasch ................. F16D 28/00
74/473.36
(Continued)

FOREIGN PATENT DOCUMENTS

CN    1112173 A    11/1995
CN    1937363 A    3/2007
(Continued)

OTHER PUBLICATIONS

International Search Report for PCT/EP2019/084856, issued Mar. 26, 2019, 2 pages.
(Continued)

*Primary Examiner* — Bryan R Perez
(74) *Attorney, Agent, or Firm* — Dickinson Wright PLLC (57) ABSTRACT

An electric motor of a pump drive of a motor vehicle, more particularly of an oil pump, having a rotor, which comprises a motor shaft mounted to rotate about an axis of rotation. The motor shaft is coupled by means of a freewheel to a motor support, the freewheel being held on the motor support by means of a securing device. Further disclosed is a pump drive of a motor vehicle.

16 Claims, 6 Drawing Sheets

(58) Field of Classification Search
CPC ........ H02K 7/083; H02K 7/1185; H02K 7/10; H02K 7/006; H02K 7/003; H02K 2213/03

See application file for complete search history.

(56) References Cited

U.S. PATENT DOCUMENTS

2017/0217301 A1* 8/2017 Nagao ................ H02K 5/04
2018/0363761 A1* 12/2018 Parisi ................ F16H 61/0028

FOREIGN PATENT DOCUMENTS

| | | |
|---|---|---|
| CN | 201075899 Y | 6/2008 |
| CN | 104791399 A | 7/2015 |
| DE | 3321172 A1 | 12/1984 |
| DE | 3420371 A1 | 7/1985 |
| DE | 102011121935 A1 | 6/2013 |
| JP | 2007153113 A | 6/2007 |
| JP | 1352269 B2 | 10/2009 |
| JP | 4352269 B2 | 10/2009 |
| RU | 2249733 C1 | 4/2005 |
| WO | 2013007247 A1 | 1/2013 |

OTHER PUBLICATIONS

Chinese Office Action for CN 201980080208.X dated Oct. 20, 2023, Google English Machine Translation attached to original, All together 14 Pages.

* cited by examiner

ELECTRIC MOTOR

CROSS-REFERENCE TO RELATED APPLICATIONS

This application is the U.S. National Phase of PCT Application No. PCT/EP2019/084856 filed on Dec. 12, 2019, which claims priority to German Patent Application No. DE 10 2018 221 829.3, filed on Dec. 14, 2018, the disclosures of which are hereby incorporated in their entirety by reference herein.

TECHNICAL FIELD

The present disclosure relates to an electric motor of a pump drive of a motor vehicle for an oil pump, for example.

BACKGROUND

Motor vehicles usually have an internal combustion engine or other units, such as a transmission, in which there is comparatively rapid movement of individual components relative to one another. The use of a lubricant to minimize mechanical losses which occur in this process is a known practice. In this case, an oil is used as a lubricant, for example. Owing to abrasion of the individual components which nevertheless occurs, it is necessary for the oil to be circulated and for any foreign particles to be separated out by means of a filter. In addition, heat is removed as a result of the circulation, thus cooling the internal combustion engine or the other unit. In this case, the oil itself is usually passed through an oil cooler, by means of which the heat is dissipated into the surroundings of the motor vehicle.

SUMMARY

One or more objects of the present disclosure may be to provide a suitable electric motor of a pump drive of a motor vehicle and a particularly suitable pump drive, with increased reliability and able to be expediently assembled.

The electric motor is a component of a pump drive. The pump drive is suitable, suitably provided and set up to drive a pump head of a pump. The pump head is expediently matched to the respective fluid to be pumped, in particular the liquid to be pumped. In the assembled state, the pump drive may be secured on the pump head, where present. The pump is a water pump, for example. As an alternative to this, the pump is a hydraulic pump, for example. In one or more embodiments, however, the pump is a lubricant pump, expediently an oil pump. In this context, a transmission oil is used as the oil, for example. As an example, however, the oil pump is used to pump an oil of an internal combustion engine. The pump drive thus serves, for example, to circulate oil in an internal combustion engine. The pump drive is suitable for this purpose, in particular being provided and set up for this purpose.

The pump drive itself is a component of a motor vehicle, such as a land-based motor vehicle. In the intended use, the land-based motor vehicle is thus moved on land. In this context, the motor vehicle is expediently moved independently of a lane, but, may be moved along a lane, the lane being produced from asphalt/tar, for example. The land-based motor vehicle expediently comprises a number of wheels, which stand on the ground and by which contact with the land is achieved. The land-based motor vehicle may be a passenger vehicle (passenger car) or a commercial vehicle, such as a truck or a bus. As an example, at least one of the wheels, for example two or all of the wheels, is at least partially driven by the internal combustion engine, where present, e.g. via a transmission arranged therebetween.

The electric motor has a rotor with a motor shaft. The rotor and thus also the motor shaft are mounted so as to be rotatable about an axis of rotation. The motor shaft expediently extends along the axis of rotation and may be concentric with respect thereto. As an example, the motor shaft is of cylindrical configuration, e.g. in the form of a hollow cylinder or a solid cylinder. The cylinder axis expediently coincides with the axis of rotation. The motor shaft is expediently made from a metal, such as a steel, e.g. a stainless steel. In addition, the electric motor has a motor mount, to which the motor shaft is coupled. In this case, the motor shaft, and expediently the entire rotor, is mounted so as to be rotatable about the axis of rotation with respect to the motor mount.

The motor shaft is coupled to the motor mount by a freewheel. The motor mount expediently at least partially receives the freewheel. As an example, the freewheel is attached to the motor shaft and the motor mount. It is appropriate if the freewheel provides at least part of the support for the rotor relative to the motor mount. In other words, the freewheel serves at least partially as a bearing and/or is configured as a bearing. Consequently, the motor mount serves at least partially as a bearing shield. Expediently, the motor mount is arranged on a drive side of the electric motor and thus functions as an A-side bearing shield. In a further alternative to this, a bearing is additionally present.

By means of the freewheel, the direction of rotation of the motor shaft with respect to the motor mount is restricted. As an example, on account of the freewheel, only a rotational movement of the rotor and thus also of the motor shaft in just one direction is possible. In summary, support for the motor shaft with respect to the motor mount is provided, by means of the freewheel, for which purpose the freewheel is attached both to the motor mount and to the motor shaft. The freewheel is expediently secured at least partially on the motor shaft or at least on a section of the motor shaft. In this case, the freewheel is used to ensure that a rotational movement of the motor shaft with respect to the motor mount can take place only in a single direction. Thus, in the event of an external force acting on the motor shaft, for example, the latter is locked on account of the freewheel, at least when the force is directed counter to the permitted direction of rotation.

The freewheel is held on the motor mount by means of a securing device. By virtue of the securing device, movement of the freewheel relative to the motor mount is at least partially prevented. In other words, the freewheel is stabilized relative to the motor mount on account of the securing device. As an example, movement of the freewheel in an axial direction (axial direction) and/or in a tangential direction (tangential direction) is prevented here by means of the securing device. As an example, the axial/tangential direction is defined with respect to the axis of rotation, and the axial direction may be parallel to the axis of rotation. It is appropriate if prevention in each case takes place at least in one direction, for example in each case in opposite directions. In other words, a complete axial or tangential movement is thus prevented. Movement of the freewheel relative to the motor mount may be prevented both in the axial and in the tangential direction.

In summary, the freewheel may be held nonrotatably on the motor mount by the securing device. By virtue of the securing device, it is ensured that the freewheel is secured with respect to the motor mount even after a comparatively long operating time or under comparatively unfavorable conditions, thus ensuring that reverse rotation of the motor shaft, i.e. a movement counter to the direction of rotation predetermined by means of the freewheel, is always prevented. Thus, reliability is increased. Moreover, by virtue of the additional securing device, there is no need for comparatively complicated mounting of the freewheel on the motor mount, as is the case, for example, with the implementation of a press fit, in which the individual parts, that is to say, the freewheel and the motor mount, are brought to different temperatures and assembled in this state. Furthermore, the securing device also ensures reliability in the case of comparatively large temperature fluctuations of the motor mount and the freewheel.

It is expedient if the freewheel is nonrotatably attached, e.g. secured, to the motor mount by means of the securing device. In this way, wear of the motor mount and/or of the freewheel is prevented. It is also always ensured that the rotor can only be rotated in the specified direction. As an example, the motor mount has an aperture into which the freewheel is inserted. In this case, for example, the freewheel is pressed into the aperture, thus producing a press fit between the freewheel and the motor mount. Thus, reliability is further increased. However, owing to the securing device, the press fit is not absolutely necessary.

The motor mount is made from a metal, for example, e.g. in a casting process. As an example, the motor mount is manufactured from an aluminum, e.g. pure aluminum or an aluminum. Thus, the weight of the electric motor is reduced. The motor mount is suitably produced by means of aluminum die casting. Alternatively, in combination with this, the freewheel is manufactured in part from a steel. Thus, robustness is increased and wear is reduced. On account of the securing device, it is ensured that the torque to be transmitted and/or the acting axial force are/is always absorbed, even when the electric motor is heated.

The motor mount may include one or more sections by means of which it is possible to secure the electric motor on further components. In other words, the motor mount may also used to secure the electric motor on further components of the pump drive and/or of the motor vehicle. As an example, the motor mount comprises a bearing surface and/or a number of fastening elements or at least sockets for fastening elements, such as screws.

The freewheel expediently has an outer sleeve which, in the assembled state, rests mechanically directly against the motor mount, e.g. on the circumference of the aperture, where present. In this case, the aperture is suitably matched to the dimensions of the outer sleeve. The outer sleeve may be of hollow cylindrical configuration and/or is arranged concentrically with respect to the axis of rotation. In other words, the radially outer boundary of the freewheel may be formed at least partially, or completely, by the outer sleeve. In this context, the radial direction (radial direction) is defined, with respect to the axis of rotation.

A radially outwardly projecting collar may be formed on the outer sleeve. In other words, the collar and the sleeve are integral (monolithic) with one another. The collar is suitably situated at one of the ends of the sleeve in the axial direction, that is to say parallel to the axis of rotation. The outer circumference of the collar may be larger than the dimensions of the aperture in the motor mount. In the assembled state, the collar expediently rests against the motor mount. Thus, the collar serves at least partially as a means of preventing the freewheel from being inserted too far into the motor mount and thus of preventing movement. Consequently, the collar at least partially forms a component of the securing device by means of which axial movement of the freewheel relative to the motor mount is prevented. During assembly, the sleeve is first of all inserted into the aperture in the motor mount until the collar rests against the latter. In this case, the sleeve projects at least partially through the motor mount, the aperture in the latter. In the assembled state, the collar is expediently arranged within a housing of the electric motor. The latter is thus protected by the housing against any damage, e.g. during assembly of the electric motor.

As an example, the collar has a tangential stop, which rests against a corresponding peg of the motor mount. The tangential stop rests against the peg in the tangential direction, such as with respect to the axis of rotation. Thus, by means of the peg and the tangential stop, rotation of the collar and thus also of the sleeve in the tangential direction with respect to the motor mount is prevented, at least in one direction. Here, the stop of the collar and the peg form a part of the securing device by means of which the freewheel is held in an at least partially nonrotatable manner with respect to the motor mount. The tangential stop is, for example, a radially outwardly directed projection or a radially inwardly directed notch. At the least, the shape of the collar deviates from an annular shape on account of the tangential stop. The peg extends, for example, in the axial direction, and therefore it expediently projects beyond the collar in the axial direction. Thus, contact between the peg and the tangential stop is always ensured, even when there is an axial movement of the collar, due to vibration for example.

The cross section of the peg perpendicularly to the axis of rotation is, for example, matched to the respective requirements. By virtue of the tangential stop and the peg, complete prevention of movement of the freewheel relative to the motor mount in the tangential direction is expediently effected. For this purpose, the stop engages around the peg or the peg engages around the stop in the tangential direction.

For example, the peg always has a constant cross section over its extent in the axial direction. Thus, assembly is simplified. As an example, a free end of the peg, such as the end of the peg which is not formed on further components of the motor mount, is deformed. The deformation is suitably effected after the mounting of the freewheel. As an example, the deformation is in the manner of a rivet, and therefore the peg is of rivet-shaped configuration. In other words, the freewheel is riveted to the motor mount. Alternatively, wobble riveting, that is to say radial riveting, is performed, ensuring that deformation takes place with a comparatively low expenditure of force. As a result of the deformation, nondestructive detachment of the freewheel from the motor mount is not possible, further increasing robustness. In addition, owing to the deformation at the end, movement of the freewheel in the axial direction with respect to the motor mount is completely prevented, and thus reliability is further increased. By virtue of the stop, movement in the tangential direction is furthermore at least partially prevented.

The tangential stop expediently rests in positive engagement against the peg. Thus, on the one hand, assembly is only possible in a specific position, making it easier. On the other hand, owing to the positive-locking contact, comparatively effective force transmission takes place between the peg and the collar, for which reason movement of the sleeve with respect to the motor mount is prevented in a comparatively effective way. Damage to the tangential stop or the peg is also prevented in this way in the event that the force acting is comparatively large.

For example, the peg has a round cross section, the cross section being, for example, perpendicular to the axis of rotation. In other words, the peg is of cylindrical configuration. Thus, production of the motor mount is simplified. Moreover, deformation of the peg at the free end is facilitated in this way, if this is carried out. In this case, the tangential stop is suitably formed by means of a notch. The notch expediently has a round cross section or at least a semicircular cross section, and the peg expediently lies in the notch. Thus, robustness is increased.

Alternatively, the peg is of rectilinear configuration on the side facing the collar. For example, the cross section of the peg is rectangular. The peg may have a symmetrical shape with respect to a radial straight line, and the side facing the collar may be perpendicular to this radial straight line. In this case, the tangential stop may be formed by means of a flat. As an example, the tangential stop is likewise a rectilinear region of the collar, and the collar may be otherwise annular in shape. Owing to the rectilinear characteristics, comparatively effective transmission of force takes place between the peg and the collar, the peg being of comparatively robust design. In this way, rotation of the freewheel relative to the motor mount is effectively prevented. In this case too, damage to the individual components is also substantially ruled out. Moreover, owing to the comparatively great extent of the peg, assembly is simplified.

The collar may include a further tangential stop. The latter is expediently offset by 180° relative to the tangential stop in relation to the axis of rotation. This makes it possible to mount the freewheel on the motor mount in at least two different positions, which simplifies assembly. As an alternative to this, the motor mount has a corresponding further peg, which is offset by 180° relative to the peg in relation to the axis of rotation. On account of the further peg too, it is possible to mount the freewheel in at least two different positions relative to the motor mount, which simplifies production. In a further alternative to this, the offset which deviates from 180° is present in each case, for example.

As an example, both the further tangential stop and the further peg are present, both of which are offset by 180° relative to the tangential stop or peg. Consequently, the freewheel is secured with two pegs, increasing robustness and reliability. If the peg is of rectilinear configuration on the side facing the collar, the pegs provide, for example, a double flat. In a further alternative thereto, the configuration of the peg differs from that of the further peg and the configuration of the tangential stop differs from that of the further tangential stop, for example. Here, for example, the cross section of the peg is round and, in the case of the further peg, the side facing the collar is of rectilinear configuration.

As an example, the electric motor has a total of four pegs and four stops, which are offset by 90° relative to one another in relation to the axis of rotation. In this case, the pegs which are offset by 180° relative to one another are expediently in each case of identical configuration to one another, while the pegs which are offset by 90° relative to one another are of different configurations. As an example, two of the pegs have a round cross section, whereas, in the case of the remaining pegs, the respective side facing the collar is of rectilinear configuration. As a result of such a configuration, robustness is further increased. As an example, the pegs which have the round cross section are deformed at the free ends, and therefore it is, for example, axial securing that is accomplished by means of these pegs. By means of the pegs which are configured so as to be at least partially rectilinear, the freewheel may be secured tangentially relative to the motor mount. The tangential stops may be adapted in accordance with the respectively associated pin.

As an example, the securing device has a screw, which secures the freewheel to the motor mount. As an example, the freewheel may include the collar, and the screw projects at least partially through the collar. A head of the screw expediently rests against the collar and may press the latter against the motor mount. At the least, however, the collar is expediently arranged, such as held, between the screw head and the motor mount. The collar appropriately has a hole through which the screw is guided. Thus, both axial and tangential movement of the freewheel relative to the motor mount is prevented by means of the screw. The screw is a threaded screw, for example. The screw may be secured on the motor mount from the inside of the housing of the electric motor. As an alternative to this, the screw is attached from the outside of the housing of the electric motor.

The electric motor expediently has a stator which is fixed in terms of rotation with respect to the motor mount. The stator suitably has a number of magnets. As an example, the electric motor comprises a housing, within which the stator is arranged and which is at least partially closed by means of the motor mount. The housing may have a substantially hollow cylindrical shape, and the motor mount may be arranged, such as, on one of the end faces of the housing and may be secured on the latter. If the collar formed on the sleeve is present, it is suitably arranged on the side of the motor mount facing the stator, thus ensuring that the collar is protected.

Alternatively, or in combination therewith, the rotor has a laminated core, which is secured on the motor shaft for conjoint rotation therewith. A number of magnets is held in a suitable manner on the laminated core and these may interact with the magnet of the possible stator during operation. For example, the stator comprises a number of permanent magnets, and the rotor has a number of electromagnets. In this case, the electric motor is configured as a commutator motor with brushes, for example. As an example, however, the electric motor is configured as a brushless electric motor, for example as a brushless DC motor (BLDC). Thus, the stator has a number of electromagnets, which are supplied with current by means of electronics. In a suitable manner, the electromagnets are connected together to form a plurality of phases, e.g. three phases, which are in turn interconnected, for example in a delta or star circuit. A number of permanent magnets is expediently secured on the laminated core, e.g. on its circumference or embedded therein.

For example, the electric motor has a rated and/or maximum power of between 10 W and 10 kW, between 50 W and 500 W, or between 100 W and 200 W. The electric motor is expediently suitable, provided and set up, to be supplied with current by means of an on-board electrical system of the motor vehicle. In this case, an electrical voltage applied to the electric motor in the operating state is, for example, 12 V, 24 V or 42 V. As an alternative to this, the electrical voltage is between 200 V and 800 V, and therefore a high-voltage on-board electrical system can be used.

The pump drive is a component of a motor vehicle, such as a passenger car (car) or a commercial vehicle, e.g. a heavy goods vehicle (truck) or a bus. The pump drive may include a transmission, which expediently comprises a plurality of gearwheels, which are in engagement with one another, at least as a function of a specific shifting position. In this case, as a function of the possible shifting position for example, at least one of the gearwheels, such as a number of the gearwheels, is mechanically separated from other gearwheels of the transmission. For example, the transmission is an epicyclic transmission, such as a planetary transmission.

The pump drive furthermore has an electric motor. For example, the electric motor is a commutator motor with brushes. As an example, however, the electric motor is of brushless configuration and is, for example, a brushless DC motor (BLDC). The electric motor is, for example, an asynchronous motor or a synchronous motor. The electric motor has a rotor with a motor shaft mounted around an axis of rotation. The motor shaft is coupled to a motor mount by means of a freewheel, and the freewheel is held on the motor mount by means of a securing device. During operation, the securing device may prevent axial and/or tangential movement of the freewheel relative to the motor mount. One of the gearwheels, e.g. a plurality of the gearwheels, of the transmission, is secured on the motor shaft for conjoint rotation therewith. For example, the gearwheel is formed integrally with the motor shaft and is thus formed thereon.

The transmission is suitably driven by means of an additional drive. The additional drive is, for example, a possible internal combustion engine of the motor vehicle. On account of the freewheel, rotation of the motor shaft is made possible only in one direction with respect to the motor mount. Consequently, on account of the freewheel, a generator operation of the electric motor is prevented. As a result, no electrical voltages are induced in any electromagnets of the electric motor which could have an effect on any on-board electrical system and/or a bus system of the motor vehicle.

In the assembled state, a pump head may be driven by the transmission, and the pump head may be secured on the transmission. If the transmission is an epicyclic transmission, the sun gear may be the gearwheel secured on the motor shaft. The pump head is expediently secured on the planet carrier, with the result that the latter is rotated at the same rotational speed as the planet carrier. The freewheel is suitably driven by means of the internal combustion engine, where present. As a result of the freewheel, rotation of the sun gear in an unwanted direction is thus prevented when the freewheel is being driven by means of the internal combustion engine.

The pump drive is suitably part of a pump, such as a water pump. As an example, however, an oil is pumped by means of the pump. The oil is, for example, a hydraulic oil, and the pump is a hydraulic oil pump. As an example, however, the pump is a lubricant pump, by means of which oil for lubricating individual components is pumped. In this case, the oil pump is suitably a component of a transmission or of an internal combustion engine, or at least serves to pump oil through the internal combustion engine or the transmission.

BRIEF DESCRIPTION OF THE DRAWINGS

In all the figures, mutually corresponding parts are provided with the same reference signs.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

To circulate the oil, an oil pump having a pump drive and a pump head is usually used. In most cases, the pump head is driven directly by the internal combustion engine, which thus at least partially represents the pump drive. At an increased speed of the internal combustion engine, a larger quantity of oil is thus delivered. However, if the motor vehicle is equipped with an automatic switch-off system (automatic start/stop system), the internal combustion engine is stopped even when the motor vehicle is at a standstill for a comparatively short time, as in the case of stopping at a traffic light. Thus, the oil pump is not operated, and an oil film which has formed on the individual components of the internal combustion engine or of the other unit may detach itself. Consequently, friction and also wear are increased during subsequent further movement of the motor vehicle.

An alternative embodiment to this is a fully electric oil pump. In this case, the oil pump is driven by means of an electric motor independently of a speed of the internal combustion engine, and therefore the oil is in each case delivered in accordance with requirements. Additional delivery when the motor vehicle is at a standstill is thus also possible. In this case, however, the electric motor is operated continuously during the operation of the motor vehicle. As a result, it is necessary for the individual components of the electric motor to operate for a comparatively long time. In addition, the maximum and average power demanded of the electric motor is comparatively high, which is why comparatively robust components must be used for the electric motor for this reason too. In addition, owing to the continuous operation of the electric motor, there is comparatively severe heating, and therefore a comparatively high temperature resistance of the individual components of the electric motor is also required. All of this leads to increased production costs for the electric motor and to an increased weight.

In a further alternative embodiment, the oil pump is driven by means of the internal combustion engine, and there is an additional secondary oil pump. By means of this, a parallel cooling circuit is formed, and this is activated when the internal combustion engine is at a standstill. Owing to the parallel connection of the two circuits, there is a need for valves, which are actuated according to the operating state of the internal combustion engine, thus preventing the formation of parasitic flows. Comparatively complex routing of lines is also required. Thus, production costs and weight are increased and assembly is made more difficult.

WO 2013/007247 A1 discloses an oil pump which has only a single pump head. The latter is driven by means of an internal combustion engine. An electric motor acts on the pump head via a freewheel, and therefore, when the internal combustion engine is at a standstill, the pump head can be driven by means of the electric motor.

Figure 1:
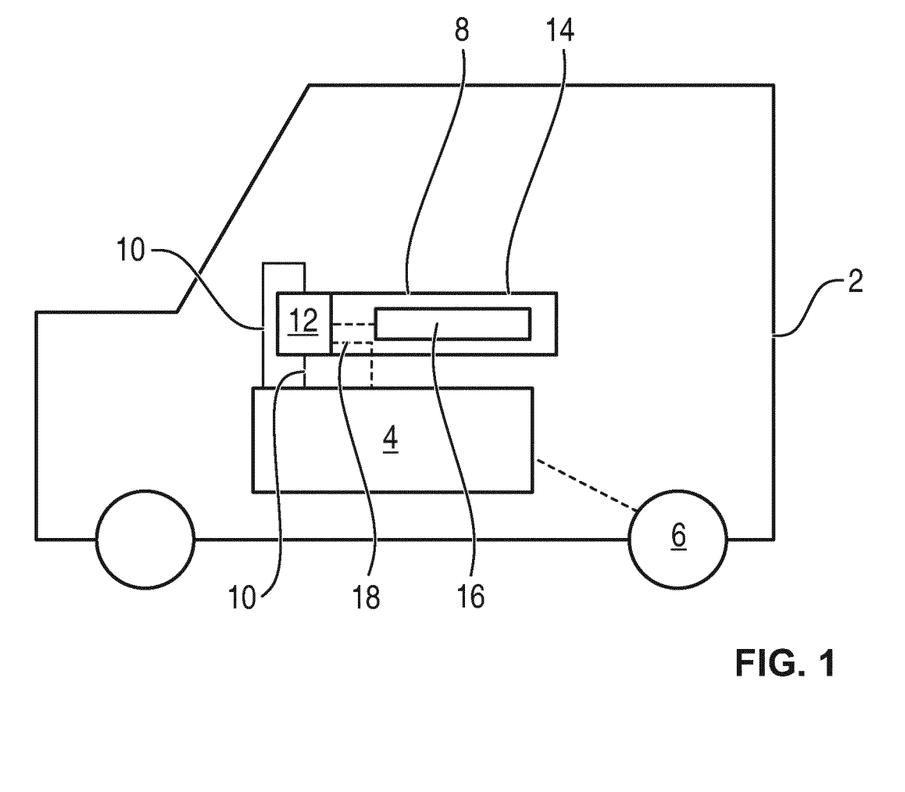
FIG. 1 shows schematically a motor vehicle having an oil pump.

FIG. 1 schematically shows, in simplified form, a motor vehicle 2 with an internal combustion engine 4. By means of the internal combustion engine 4, some of the wheels 6 of the motor vehicle 2 are driven, e.g. via a transmission (not illustrated specifically) and/or an electric motor, the electrical energy required for the electric motor being provided at least partially by means of the internal combustion engine 4.

In addition, the motor vehicle 2 has an oil pump 8, by means of which an oil located at least partially within the internal combustion engine 4 is circulated. For this purpose, the oil pump 8 is fluidically connected to the internal combustion engine 4 by a plurality of lines 10. Thus, during operation of the oil pump 8, oil is delivered from the internal combustion engine 4 to a filter (not illustrated specifically) and to an oil cooler and from there back into the internal combustion engine 4. As a result, the internal combustion engine 4 is lubricated, preventing friction. Cooling of the internal combustion engine 4 also takes place since heat is carried away to the oil cooler by the oil. By virtue of the oil filter, foreign particles in the oil are separated out, thus increasing an operating time of the internal combustion engine 4.

The oil pump 8, which is a lubricant pump, has a pump head 12 with an impeller (not illustrated specifically), by which the oil is moved through the lines 10. The pump head 12 is driven by a pump drive 14, which is secured on the pump head 12. The pump drive 14 has an electric motor 16 and an additional drive 18, which is provided by the internal combustion engine 4. Thus, the pump head 12 is driven either by the electric motor 6, by the additional drive 18, or by both.

Figure 2:
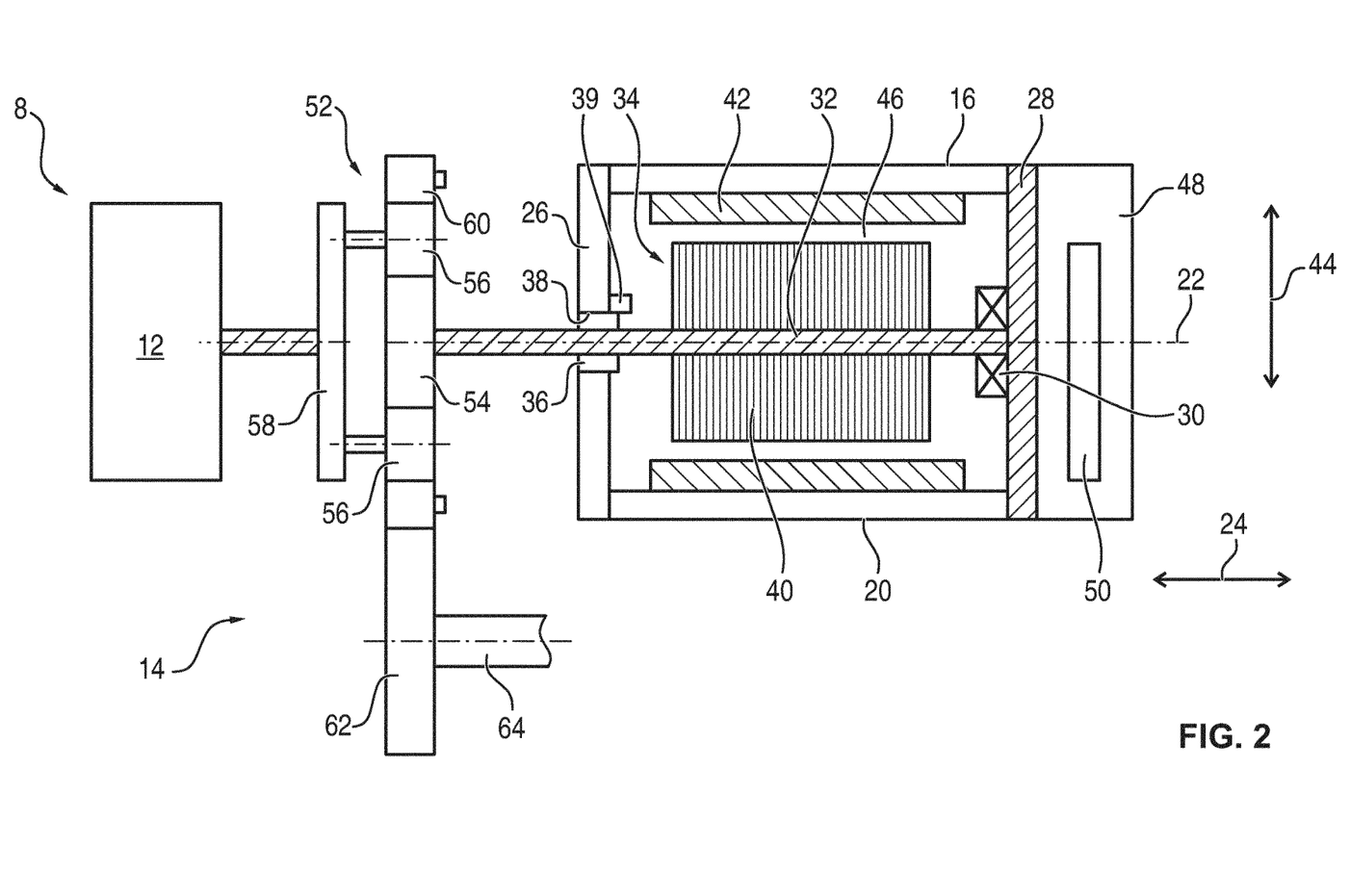
FIG. 2 shows schematically the oil pump having a pump drive with an electric motor.

FIG. 2 shows the oil pump 8 in a schematically simplified form. The electric motor 16 has a hollow cylindrical housing 20, which is an aluminum die casting and extends along an axis of rotation 22 and is arranged concentrically thereto. At one end of the housing 20 in an axial direction 24 which is parallel to the axis of rotation 22, the housing 20 is closed by a motor mount 26. The opposite side of the housing 20 is closed by a B-side bearing shield 28, on which a ball bearing 30 is secured. By the ball bearing 30, a motor shaft 32 of a rotor 34 is mounted so as to be rotatable about the axis of rotation 22. The motor shaft 32 extends parallel to the axis of rotation 22 and is arranged concentrically therewith. Moreover, the motor shaft 32 is supported by means of a freewheel 36 and is consequently attached to the latter. The freewheel 36 is coupled to the motor mount 26 and is arranged there at least partially in an aperture 38 of the motor mount 32. There, the freewheel 36 is held by means of a securing device 39 so as to be nonrotatable relative to the motor mount 26, and therefore movement of the freewheel 38 in the axial direction 24, as well as rotation about the axis of rotation 22, is prevented.

The freewheel 36 is used to ensure that the motor shaft 32 can be rotated in only one direction about the axis of rotation 22. In contrast, locking takes place in the opposite direction. The motor shaft 32 is made from a steel and carries a laminated core 40 of the rotor 34, which laminated core is secured on the motor shaft 32 for conjoint rotation therewith and is arranged between the motor mount 26 and the B-side bearing shield 28 in the axial direction 24. A plurality of permanent magnets (not illustrated specifically) is held by the laminated core 40.

The laminated core 40 is surrounded circumferentially by a stator 42, which is spaced apart from the laminated core and the complete rotor 34 in a radial direction 44 by a circumferential air gap 46. The stator 42 has a number of electromagnets (not illustrated specifically), which are connected together to form three phases. Thus, the electric motor 16 is configured as brushless DC motors (BLDC). The stator 42 is arranged within and secured on the housing 20, which is secured on the motor mount 26. Thus, the stator 42 is fixed in terms of rotation relative to the motor mount 26. An electronics compartment 48 with electronics 50 arranged therein is connected to the B-side bearing shield 28. During operation, the electromagnets of the stator 42 are supplied with current by the electronics 50.

The pump drive 14 also has a transmission 52 in the form of an epicyclic transmission, which comprises a gearwheel 54 that functions as a sun gear. The gearwheel 54 is secured for conjoint rotation on a free end of the motor shaft 32, which extends through the motor mount 26. Thus, the gearwheel 54 is also mounted so as to be rotatable about the axis of rotation 22, and the epicyclic transmission 52 is aligned with respect to the axis of rotation 22. The (epicyclic) transmission 52 has a plurality of planet gears 56 which are rotatably mounted on a common planet carrier 58, which in turn is mounted so as to be rotatable about the axis of rotation 22. In this case, the planet carriers 56 are likewise gearwheels and are at least partially in engagement with gearwheel 54. The pump head 12 or at least a shaft of the pump head 12 is secured on the planet carrier 58 for conjoint rotation therewith. The planet gears 56 are surrounded by a ring gear 60, which is toothed both externally and internally. The internal toothing is in engagement with the planet gears 56. The external toothing of the ring gear 60 is in engagement with a further gearwheel 62, which is driven by the internal combustion engine 4 via a shaft 64.

When the internal combustion engine 4 is at a standstill, the further gearwheel 62 and thus also the ring gear 60 are locked owing to the comparatively high friction within the internal combustion engine 4, for example its crankshaft, and owing to the necessary compression of any cylinders. If the electric motor 16 is operated in this case, the planet gears 56 ensure that a rotational movement of gearwheel 54 is transmitted to the planet carrier 58 and thus the pump head 12 is driven. Such operation takes place, for example, when the motor vehicle 2 is being operated but the internal combustion engine 4 is stopped briefly, particularly in the event of a stop at a traffic light.

If the internal combustion engine 4 is driven and thus the shaft 64 is rotated, the ring gear 60 is driven. This rotational movement is transmitted to the planet gears 56. Because of the freewheel 36, the rotational movement is not transmitted to the motor shaft 32. For this purpose, the direction of rotation of the shaft 64 and the locking direction of the freewheel 36 are suitably matched to one another. As a result, the planet carrier 58 and consequently also the pump head 12 are driven. Thus, no energy is used to drive the rotor 34, thus increasing efficiency. In addition, induction of electrical voltage in the electromagnets of the stator 42 is prevented in this way, ensuring that overloading of the electronics 50 is avoided, which could otherwise lead to their destruction and/or to the propagation of voltage peaks in an on-board electrical system and/or bus system of the motor vehicle 2 (not illustrated specifically). In summary, the pump head 12 is driven and thus the oil is delivered when the internal combustion engine 4 is being operated. In this case, no current is required for the electric motor 16, and, as a result, it is not excessively heated and therefore loaded. Components which are comparatively inexpensive can thus be used.

If, owing to a comparatively high power requirement and/or comparatively severe heating of the internal combustion engine 4, for example, the amount of oil to be pumped is to be increased, it is furthermore possible to operate the electric motor 16 in addition and thus also to drive gearwheel 54. As a result, the pump head 12 is driven both by the internal combustion engine 4 and by the electric motor 16, and the rotational speed of the planet carrier 58 is increased by virtue of the drive of gearwheel 54 and of the further gearwheel 62.

Figure 3:
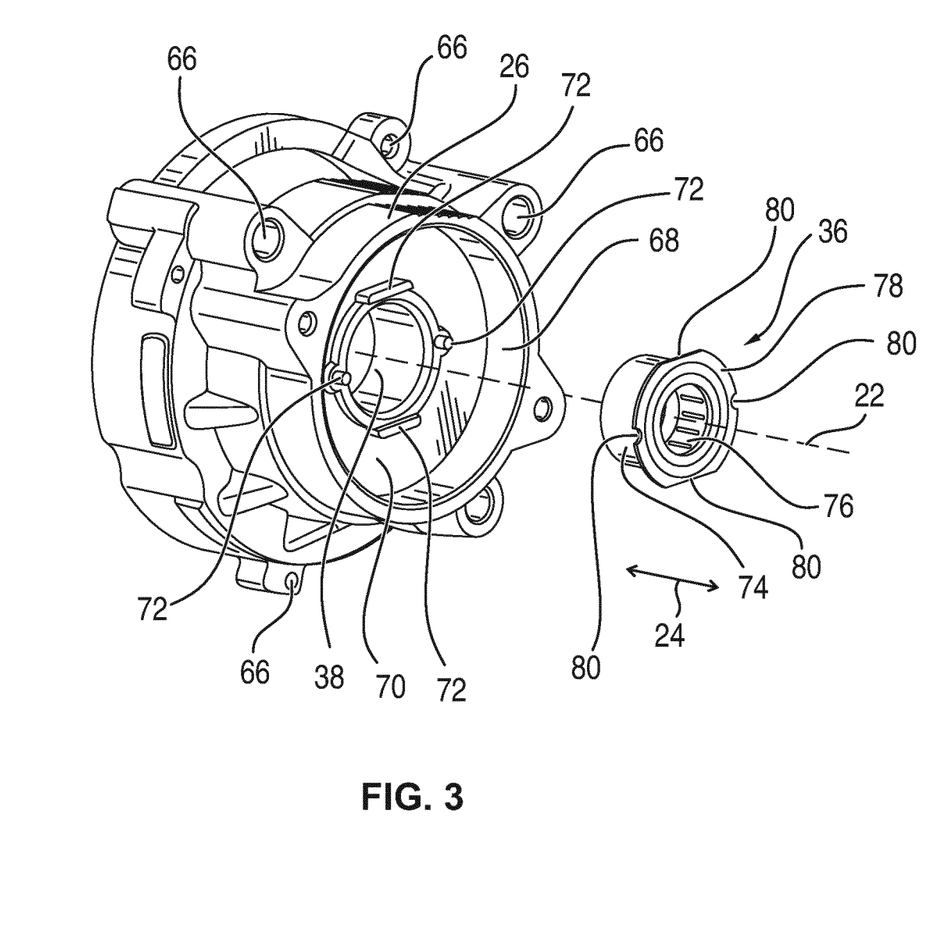
FIG. 3 shows a perspective view of a motor mount, having a peg, of the electric motor, as well as a freewheel.

In FIG. 3, the motor mount 26 is shown in a perspective view. The motor mount 26 has a number of sockets 66 for fastening elements (not illustrated specifically), by which the motor mount 26 is secured on the pump head 12, the transmission 52 and/or some other component of the motor vehicle 2 in the assembled state. In addition, the motor mount 26 has a pot-shaped section 68, which faces the housing 20 (not illustrated specifically) and has a pot base 70, which is perpendicular to the axis of rotation 22. The aperture 38, which is cylindrical and concentric with the axis of rotation 22, passes through the pot base 70.

A total of four pegs 72, which are offset by 90° relative to one another in relation to the axis of rotation 22 and extend in the axial direction 24, are formed on the pot base 70. The pegs 72 are offset away from the aperture 38 in the radial direction 44, but only by a comparatively small value, for example between 2 mm and 5 mm. The respective pegs 72 which are offset relative to one another by 180° in relation to the axis of rotation 22 are structurally identical to one another, two of the pegs 72 having a cross section which is round perpendicularly to the axis of rotation 22. The remaining pegs 72 have a rectangular cross section and are axissymmetrical with respect to a common radial straight line. The two pegs 72 which have a substantially rectangular cross section thus have a side of rectilinear configuration facing the aperture 38, and a double flat is formed by these pegs 72. In summary, the pegs 72 are arranged and configured overall in a point-symmetrical and axis-symmetrical manner with respect to two radial straight lines which are perpendicular to one another.

Figure 4:
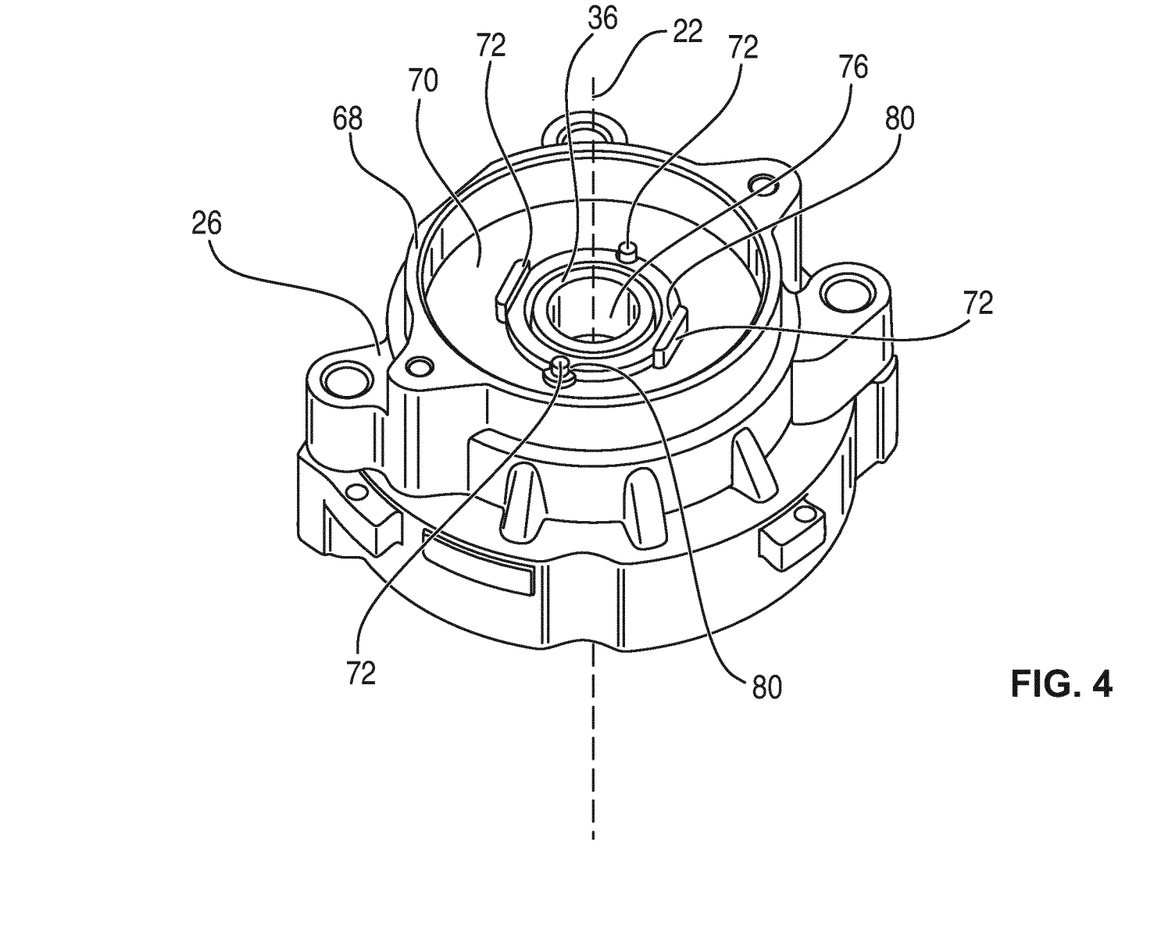
FIG. 4 shows the freewheel held on the motor mount.

The freewheel 36 has an outer sleeve 74 of hollow-cylindrical configuration which, in the assembled state, which is shown in FIG. 4, is arranged in the aperture 38 and rests on the circumference of the motor mount 26. In this case, a press fit is expediently formed between the outer sleeve 74 and the motor mount 26. The freewheel 36 further comprises an inner sleeve 76, which is likewise of hollow-cylindrical configuration and is arranged concentrically with the axis of rotation 22. The inner sleeve 76 is received by the outer sleeve 74 and is mounted so as to be rotatable with respect to the latter in one direction. A locking device (not illustrated specifically), may prevent rotation in the opposite direction. In the assembled state, the inner sleeve 76 is secured on the motor shaft 32 for conjoint rotation therewith.

A radially outwardly projecting collar 78 is formed on the outer sleeve 74 at one end in the axial direction 24. The outside diameter of the collar 78 is larger than the diameter of the aperture 38 and, for assembly, the freewheel 36 is introduced into the aperture 38 in the axial direction 24 with the side of the outer sleeve 74 lying opposite the collar 78 until the collar 78 strikes against the motor mount 26. Thus, the collar 78 at least partially forms the securing device 39.

In addition, the collar has a total of four tangential stops 80, which are offset by 90° relative to one another in relation to the axis of rotation. In the assembled state, each of the tangential stops 80 is assigned one of the pegs 72, against which the respective tangential stop 80 rests in positive engagement. In summary, each tangential stop 80 rests in positive engagement against the respectively associated, that is to say the corresponding, peg 72. Thus, two of the tangential stops 80 may be provided by a semicircular notch, namely those to which the pegs 72 having the round cross section are assigned. The remaining tangential stops 80 may be formed by a flat, i.e. a substantially rectilinear outer edge of the collar 78.

Owing to the engagement of the pegs 72 or the contact of the stops 80 on the pegs 72, a rotational movement of the collar 78 about the axis of rotation 22 and thus of the outer sleeve 74 with respect to the motor mount 26 is prevented. Thus, the pegs 72 as well as the tangential stops 80 partially form the securing device 39 by which a rotation of the freewheel 36 relative to the motor mount 26 is prevented. Owing to the collar 78, axial slippage of the freewheel 36 through the motor mounts 26 is also prevented and thus the freewheel is also partially secured in the axial direction 24.

Figure 5:
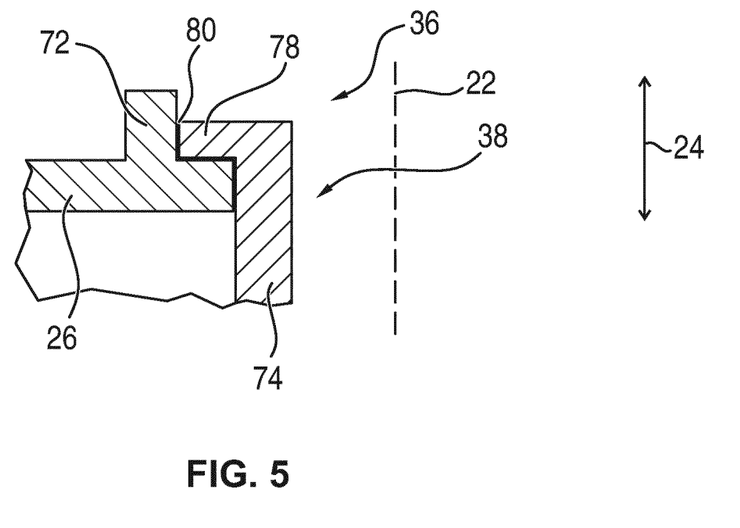
FIG. 5 shows the peg during assembly in a sectional view along an axis of rotation, FIG. 6, which corresponds to FIG. 5, shows the peg after assembly, FIGS. 7 and 8, which correspond to FIG. 3, each show a further embodiment of the motor mount.

In FIG. 5, in a sectional view along the axis of rotation 22, the freewheel 36 with the outer sleeve 74 and the collar 78, which rests on the motor mount 26, is shown in a schematically simplified manner. In this case, the pegs 72 protrude in the axial direction 24 with respect to the collar 78, thus ensuring that, even when the freewheel 36 is moved in the axial direction 24, the engagement of the peg 72 with the respective tangential stop 80 is always maintained.

Figure 6:
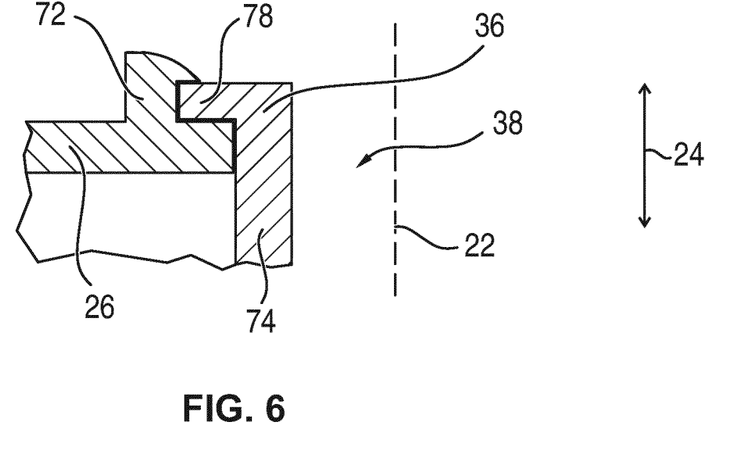

In FIG. 6, a development of the motor mount 26 is shown in accordance with FIG. 5. In this case, the peg 72 is deformed at the free end, to be precise being wobble-riveted. Thus, at the free end of the peg 72, it at least partially covers the collar 78 in the axial direction 24, for which reason the freewheel 36 can no longer be removed from the motor mount 26. In a further embodiment (not illustrated specifically), the end of the peg 72 is deformed in a rivet shape. For example, all the pegs 72 present are deformed. However, only the pegs 72 which have the round cross section are deformed. In the case of these, a comparatively low expenditure of force is required for the deformation of the respective free end.

Figure 7:
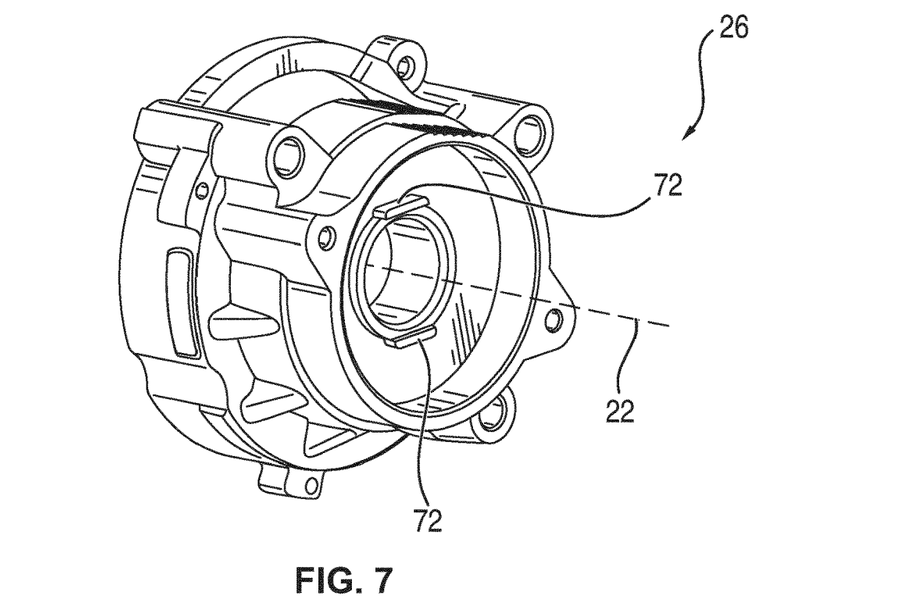

A modification of the motor mount 26 is shown in FIG. 7. The only difference with respect to the preceding embodiment is that the pegs 72 having the round cross section are omitted, and therefore only the pegs 72 having the rectangular cross section are present. Thus, only the double flat is present. As an example, the freewheel 36 (not illustrated specifically) has only the two tangential stops 80, which may be produced by the flattening. In another alternative, however, the freewheel 36 is unchanged and corresponds to the variant shown in FIG. 3. In another variant, which is not illustrated, only the pegs 72 having the round cross sections are present, whereas the pegs 72 which have the rectangular cross section are omitted. As an example, there is deformation of the pegs 72 at the free end in this case. In all embodiments, corresponding or at least structurally identical pegs 72 are offset by 180° with respect to one another in relation to the axis of rotation 22, thus enabling the freewheel 36 to be arranged in two different positions, which simplifies assembly.

Figure 8:
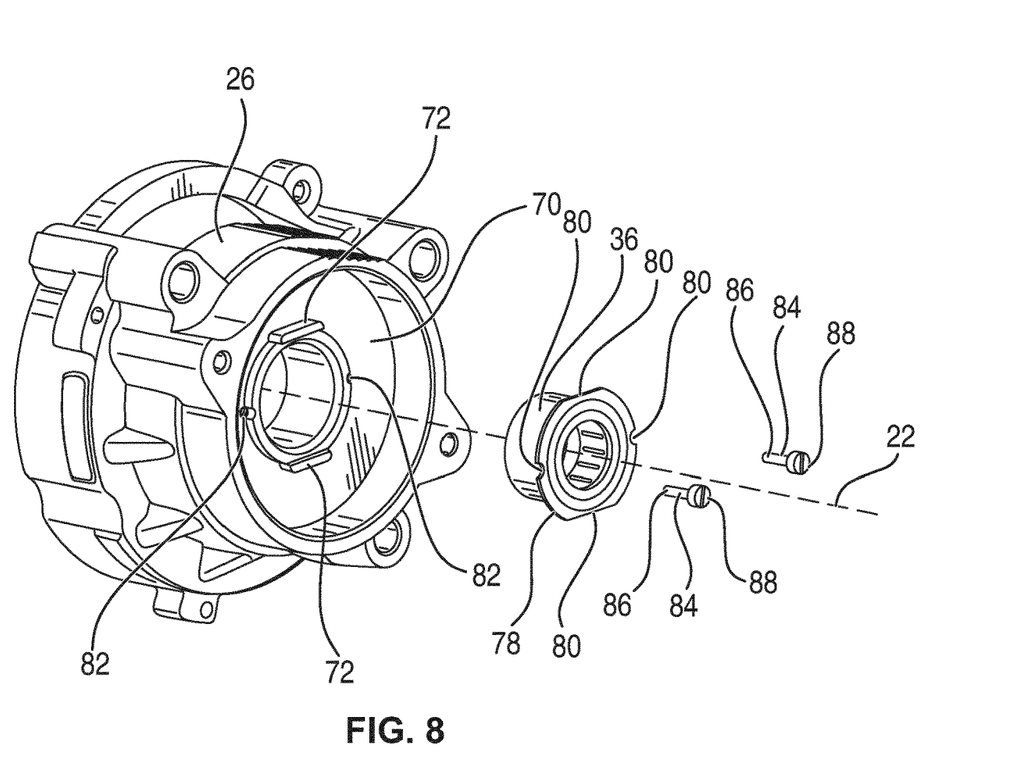

FIG. 8 shows a final embodiment of the motor mount 26, wherein the freewheel 36 corresponds to the first embodiment. In this case once again, only the pegs 72 having the rectangular cross section are present. Instead of the pegs 72 having the round cross sections, the pot base 70 has in each case one hole 82 into which, in the assembled state, in each case one screw 84 is screwed. In this case, a screw shank 86 of each screw 84 is screwed into the respective hole 82. In this case, each screw shank 86 lies at least partially in one of the notch-shaped tangential stops 80 of the collar 78. By the respective screw head 88, which is larger than the dimension of the respective tangential stop 80, the collar 78 is pressed against the pot base 70 and thus held there. In a variant that is not shown specifically, there are additional holes in the collar 78, which may be continuous all the way around and through which the respective screw shank 86 projects. Thus, positioning of the screws 84 is simplified.

In summary, the securing device 39 is used to implement an anti-rotation safeguard, so that any torque to be transmitted is absorbed. In this case, at least two of the pegs 72 are expediently designed as a double flat. The further pegs 72 are deformed in the form of rivets, for example after positioning of the freewheel 36, and these are expediently configured in the manner of wobble rivets. In this way, a positive connection is established with the freewheel 36, and any forces acting in the axial direction 24 are absorbed.

In addition, there may be a press fit between the lateral surface of the outer sleeve 74 and the boundary of the aperture 38 of the motor mount 26. In another alternative, the pegs 72 which have the rectangular cross section are likewise staked and thus deformed in the manner of a rivet. In this case, for example, the pegs 72 having the round cross section are not present. Alternatively, instead of these, the screws 84 are present, for example, the remaining pegs 72 being either staked or not staked.

The invention is not restricted to the exemplary embodiments described above. On the contrary, other variants of the invention can also be derived therefrom by a person skilled in the art without departing from the subject matter of the invention. As an example, all the individual features described in connection with the individual exemplary embodiments can also be combined with one another in some other way without departing from the subject matter of the invention.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 2 motor vehicle
4 internal combustion engine
6 wheel
8 oil pump
10 line
12 pump head
14 pump drive
16 electric motor
18 additional drive
20 housing
22 axis of rotation
24 axial direction
26 motor mount
28 B-side bearing shield
30 ball bearing
32 motor shaft
34 rotor
36 freewheel
38 aperture
39 securing device
40 laminated core
42 stator
44 radial direction
46 air gap
48 electronics compartment
50 electronics
52 transmission
54 gearwheel
56 planet gear
58 planet carrier
60 ring gear
62 further gearwheel
64 shaft
66 socket
68 pot-shaped section
70 pot base
72 peg
74 outer sleeve
76 inner sleeve
78 collar
80 tangential stop
82 hole
84 screw
86 screw shank
88 screw head

The invention claimed is:

1. A pump drive for use in a motor vehicle, the pump drive comprising:
an electric motor including,
a rotor including a motor shaft rotatable about an axis of rotation,
a motor mount, a freewheel coupling the motor shaft to the motor mount; and a transmission including a gearwheel fixed to the motor shaft and configured to conjointly rotate with the motor shaft, wherein the motor mount includes a first peg having a circular shape and configured to contact a first tangential stop formed by a collar, and wherein the first peg includes a free end and a portion of the free end is bent to sandwich a portion of the collar.

2. A pump drive for use in a motor vehicle, the pump drive comprising:
an electric motor including,
a rotor including a motor shaft rotatable about an axis of rotation,
a motor mount,
a freewheel coupling the motor shaft to the motor mount; and
a transmission including a gearwheel fixed to the motor shaft and configured to conjointly rotate with the motor shaft,
wherein the motor mount includes a first peg having a circular shape and configured to contact a first tangential stop formed by a collar, and wherein the motor mount includes a second peg having a rectilinear shape and configured to contact a second tangential stop formed by the collar.

3. The pump drive of claim 2, wherein the freewheel includes an outer sleeve and a collar extending radially outward from the outer sleeve.

4. The pump drive of claim 2, wherein the first tangential stop is formed by a notch defined by the collar.

5. The pump drive of claim 2, wherein the collar includes a substantially planar sidewall, and the substantially planar sidewall forms the second tangential stop.

6. The pump drive of claim 1, wherein the first peg and the second peg are circumferentially spaced apart by 90° with respect to the axis of rotation.

7. The pump drive of claim 2, further comprising:
a laminated core fixed to the motor shaft so that as the motor shaft rotates, the laminated core rotates.

8. The pump drive of claim 2, further comprising:
a fastener configured to fix the freewheel to the motor mount.

9. An electric motor for use in a pump drive of a motor vehicle, the electric motor comprising:
a rotor including a motor shaft rotatable about an axis of rotation;
a motor mount provided with a peg;
a freewheel coupling the motor shaft to the motor mount; and
a securing device fixing the freewheel to the motor mount,
wherein the peg includes a free end and the free end is deformed, and wherein the peg includes a first side having a rectilinear shape and faces a collar, and a tangential stop is formed by a flat.

10. The electric motor of claim 9, wherein the freewheel includes an outer sleeve and a collar integral to and radially outwardly extending from the outer sleeve.

11. The electric motor of claim 9, wherein the peg includes a free end and the free end is deformed.

12. The electric motor of claim 9, wherein the tangential stop is configured to be in positive engagement against the peg.

13. The electric motor of claim 9, wherein the peg has a round cross section, and the tangential stop is formed by a notch.

14. The electric motor of claim 9, wherein the motor mount includes a second tangential stop and/or the collar includes a second peg, wherein the second tangential stop or the second peg are offset by 180° relative to the tangential stop or the peg with respect to the axis of rotation.

15. The electric motor of claim 9, wherein the securing device includes a screw configured to secure the freewheel to the motor shaft.

16. The electric motor of claim 9, further comprising:
a stator rotationally fixed with respect to the motor mount; and
a laminated core fixed to the motor shaft and configured to conjointly rotate with the motor shaft.

* * * * *